United States Patent
Fujiyama et al.

(10) Patent No.: US 6,678,286 B1
(45) Date of Patent: Jan. 13, 2004

(54) IMAGE TRANSMISSION METHOD AND IMAGE TRANSMISSION SYSTEM

(75) Inventors: Takehiko Fujiyama, Kawasaki (JP); Toshihiro Yamanaka, Fukuoka (JP); Kenzo Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/450,616

(22) Filed: Nov. 30, 1999

(30) Foreign Application Priority Data

Jan. 19, 1999 (JP) .......................................... 11-010747

(51) Int. Cl.⁷ ................................................ H04J 3/00
(52) U.S. Cl. ........................ 370/498; 370/223; 370/442
(58) Field of Search ................................ 370/486, 485, 370/498, 503, 509, 510, 522, 535, 537, 216–218, 221–228, 229, 235, 237, 270, 321, 337, 345, 347, 389, 392, 419, 442, 443, 458, 460, 463, 465, 468, 471; 348/14.01, 14.02

(56) References Cited

U.S. PATENT DOCUMENTS 5,537,150 A * 7/1996 Sugiyama et al. .......... 348/558
5,729,282 A * 3/1998 Okawa ..................... 348/14.12
5,898,669 A * 4/1999 Shimony et al. ............ 370/232
5,991,912 A * 11/1999 Mao ........................... 714/776
6,002,668 A * 12/1999 Miyoshi et al. ............. 370/232

FOREIGN PATENT DOCUMENTS

| JP | 5-30049 | 2/1993 |
|----|---------|--------|
| JP | 9-182027 | 7/1997 |

* cited by examiner

Primary Examiner—Douglas Olms
Assistant Examiner—Brian Nguyen
(74) Attorney, Agent, or Firm—Katten Muchin Zavis Rosenman

(57) ABSTRACT

A plurality of image transmitting apparatuses are connected to the image transmitting side of a transmission line, a plurality of image receiving apparatuses are connected to the image receiving side of the transmission line, and a plurality of logical channels are set on the transmission line. A predetermined logical channel is fixedly allotted to each image receiving apparatus, and each image transmitting apparatus is provided with a function of transmitting an image to an image receiving apparatus through any logical channel. Each image transmitting apparatus transmits an image to a designated image receiving apparatus through a predetermined logical channel.

10 Claims, 13 Drawing Sheets

IMAGE TRANSMISSION METHOD AND IMAGE TRANSMISSION SYSTEM

BACKGROUND OF THE INVENTION

The present invention relates to an image transmission method and an image transmission system and, more particularly, to an image transmission method and an image transmission system for transmitting an image from an image transmitting apparatus to a predetermined image receiving apparatus through a transmission line in accordance with an instruction for transmitting an image.

A monitoring system is known for monitoring the situation of each point by a plurality of monitors provided at a monitoring center by appropriately displaying an image which is caught by a monitoring camera provided at each point and transmitted to the monitoring center through a network. For example, a monitoring system for monitoring a traffic volume in a highway network analyzes the image transmitted from each point so as to grasp the state of a traffic jam, and supplies traffic information. Another monitoring system analyzes the image transmitted from a monitoring camera set at each point which is in danger of landslide so as to grasp the landslide state, and gives an alarm.

FIG. 11 shows the structure of an example of conventional monitoring systems having a digital exchange 3, and transfer devices $4_1$ to $4_n$ between image transmitting apparatuses $1_1$ to $1_n$ and image receiving apparatuses $2_1$ to $2_m$. Digital transmission lines $5_1$ to $5_n$ connect each of the image transmitting apparatuses $1_1$ to $1_n$ to the corresponding transfer devices $4_1$ to $4_n$. All of the image transmitting apparatuses $1_1$ to $1_n$ have the same structure, which is composed of a monitoring camera $1a$, an image encoder $1b$ for encoding the image caught by the monitoring camera $1a$ and outputting the code, and a transmitter $1c$ for transmitting the coded image data to the digital exchange 3. The digital exchange 3 has a switching function, and inputs the image data transmitted from a predetermined one of the image transmitting apparatuses $1_1$ to $1_n$ to a predetermined one of the image receiving apparatuses $2_1$ to $2_m$ under an instruction from a control unit 6. The control unit 6 inputs an instruction for switching control to the digital exchange 3 on the basis of the receiving apparatus chosen by the operation of an operator. All of the image receiving apparatuses $2_1$ to $2_m$ have the same structure, which is composed of an image receiver $2a$ and a monitor $2b$. The image receiver $2a$ decodes the coded image data input from the digital exchange 3 to the original image data, converts the digital image data to analog image data, and inputs the analog image data to the monitor $2b$. The monitor $2b$ displays the image caught by the predetermined monitoring camera $1a$.

The image receiving apparatuses $2_1$ to $2_m$, the digital exchange 3, transfer devices $4_1$ to $4_n$, and the control unit 6 are provided together at a first point, which serves as a center. In this case, if it is necessary to watch a received image by an image receiving apparatus 7 which is provided at another point, a transfer device 8 is provided on the output side of the digital exchange 3, a transmission line 9 is provided between the transfer device 8 and the image receiving apparatus 7, and the image receiving apparatus 7 is composed of a transfer device $7a$, an image receiver $7b$ and a monitor $7c$.

FIG. 12 shows the structure of another monitoring system as an example of a system having an analog image exchange 13, transfer devices $14_1$ to $14_n$, and image receiving apparatuses $15_1$ to $15_n$ between image transmitting apparatuses $11_1$ to $11_n$ and monitors $12_1$ to $12_m$. Digital transmission lines $16_1$ to $16_n$ connect each of the image transmitting apparatuses $11_1$ to $11_n$ and monitors $12_1$ to $12_m$. Digital transmission lines $16_1$ to $16_n$ connect each of the image transmitting apparatuses $11_1$ to $11_n$ to the corresponding transfer devices $14_1$ to $14_n$. All of the image transmitting apparatuses $11_1$ to $11_n$ have the same structure, which is composed of a monitoring camera $11a$, an image encoder $11b$ for encoding the image caught by the monitoring camera $11a$ and outputting the code, and a transmitter $11c$ for transmitting the coded image data to the analog image exchange 13. The image receiving apparatuses $15_1$ to $15_n$ decode the coded image data input from the corresponding transfer devices $14_1$ to $14_n$ to the original image data, convert the digital image data to analog image data and input the analog image data to the analog image exchange 13. The analog image exchange 13 has a switching function, and inputs the image signal transmitted from a predetermined one of the image transmitting apparatuses $11_1$ to $11_n$ to a predetermined one of the monitors $12_1$ to $12_m$ under an instruction from a control unit 17. Each of the monitors $12_1$ to $12_m$ displays the image caught by the corresponding monitoring camera $11a$. The control unit 17 inputs an instruction for switching control to the analog image exchange 13 on the basis of the operation of a control panel (not shown) by an operator.

The monitors $12_1$ to $12_m$, the analog image exchange 13, the transfer devices $14_1$ to $14_n$, the image receiving apparatuses $15_1$ to $15_n$, and the control unit 17 are provided together at a first point, which serves as a center. In this case, if it is necessary to watch the images transmitted from the image transmitting apparatuses $11_1$ to $11_n$ by an image receiving apparatus 18 which is provided at another point, an image encoder 19 and a transfer device 20 are provided on the output side of the analog image exchange 13, a transmission line 21 is provided between the transfer device 20 and the image receiving apparatus 18, and the image receiving apparatus 18 is composed of a transfer device $18a$, an image receiver $18b$ and a monitor $18c$.

FIG. 13 shows the structure of a monitoring system proposed by the inventor. In this structure, n transmission lines $16_1$ to $16_n$ in the monitoring system shown in FIG. 12 are substituted by one annular transmission line 21. The same reference numerals are provided for the elements which are the same as those shown in FIG. 12.

A plurality of image transmitting apparatuses $11_1$ to $11_n$ are connected to the image transmitting side of the annular transmission line 21, while a plurality of image receiving apparatuses $15_1$ to $15_n$ are connected to the image receiving side of the annular transmission line 21. A plurality of logical channels $C_1$ to $C_n$ are set on the annular transmission line 21. The logical channels $C_1$ to $C_n$ are fixedly allotted to the image transmitting apparatuses $11_1$ to $11_n$, respectively, and they are also fixedly allotted to the image receiving apparatuses $15_1$ to $15_n$, respectively.

In this monitoring system, the image transmitting apparatus $11_1$ (i=1, 2, . . . n) transmits an image to the image receiving apparatus $15_i$ through the logical channel $C_i$, and the image receiving apparatus $15_i$ decodes the received coded image data to the original image data, converts the digital image data to analog image data and, inputs the analog image data to the analog image exchange 13. The analog image exchange 13 has a switching function, and inputs the image signal input from the image receiving apparatus $15_i$ to a predetermined one of the monitors $12_1$ to $12_m$ under an instruction from the control unit 17. Each of the monitors $12_1$ to $12_m$ displays the image caught by a monitoring camera.

In the prior art shown in FIG. 11, it is necessary to provide not only a digital image exchange, but also one transfer device in correspondence to one image transmitting apparatus. Consequently, the monitoring system has a large and complicated structure. The place where the monitoring system is disposed therefore requires a large area, and the cost of the monitoring system as a whole becomes disadvantageously high. In addition, in order to see the received images at another point, it is necessary to transmit the output of the digital exchange through a transfer device, which only aggravates the above-described problems.

In the prior art shown in FIG. 12 or the system shown in FIG. 13, it is necessary to provide not only an analog image exchange, but also one transfer device and one image receiver in correspondence to one image transmitting apparatus. Consequently, the monitoring system has a larger and more complicated structure than the monitoring system shown in FIG. 11. The place where the monitoring system is disposed requires a larger area, and the cost of the monitoring system as a whole becomes disadvantageously higher. In addition, in order to see the received images at another point, since it is necessary to reconvert the output (analog image) of the digital exchange by an image encoder to digital data and transmit the data through a transfer device, the deterioration of the picture quality is inevitable.

SUMMARY OF THE INVENTION

Accordingly, it is an object of the present invention to eliminate the above-described problems in the related art and to provide a monitoring system which is dispensed with an image exchange.

It is another object of the present invention to prevent a monitoring system from an increase in size and cost.

It is still another object of the present invention to provide a monitoring system which is capable of transmitting a monitored image from an image transmitting apparatus to any image receiving apparatus and which is also capable of simultaneously transmitting a monitored image to a plurality of image receiving apparatuses.

To achieve these objects, in a monitoring system provided in a first aspect of the present invention, (1) a plurality of image transmitting apparatuses are connected to the image transmitting side of a transmission line, and a plurality of image receiving apparatuses are connected to the image receiving side of the transmission line, (2) a plurality of logical channels are set on the transmission line, (3) a predetermined logical channel is fixedly allotted to each image receiving apparatus, (4) each image transmitting apparatus has a function of transmitting an image to an image receiving apparatus through any logical channel, and (5) each image transmitting apparatus transmits an image to a designated image receiving apparatus through a predetermined logical channel in accordance with an instruction for image transmission. In addition, one image transmitting apparatus simultaneously transmits an image to a plurality of image receiving apparatuses through a plurality of logical channels in accordance with an instruction for image transmission. According to the present invention having the above-described structure, an image exchange is obviated, and image receiving apparatuses provided in correspondence to monitors suffice, resulting in that it is possible to prevent a monitoring system from an increase in size and cost.

In a modification of the above-described structure, an encoder of each image transmitting apparatus is provided with an intra-frame coding system and an inter-frame coding system, and image data encoded by the intra-frame coding system are transmitted for a predetermined period of time at the start of image transmission. In this manner, it is possible to display an image on the monitor of an image receiving apparatus instantly without a temporal delay.

In another modification of the above-described structure, a first annular transmission line for transmitting image data counterclockwise, and a second annular transmission line for transmitting image data clockwise are provided as the transmission line, and the image transmitting apparatuses and the image receiving apparatuses are connected to each of the annular transmission lines. An image transmitting apparatus transmits an image through the same logical channel on both annular transmission lines. An image receiving apparatus receives the image from one of the transmission lines when the transmission line is normal, while receiving the image from the other transmission line when it is impossible to receive a normal image from the one transmission line. In this manner, each image receiving apparatus is capable of receiving and displaying an image continuously, even if a trouble is caused on either or both of the transmission lines.

An image transmitting apparatus provided in a second aspect of the present invention comprises (1) a line interface portion for receiving a frame signal composed of multiplexed image data of the logical channels from a transmission line, and transmitting a frame signal composed of image data to be transmitted from the image transmitting apparatus and the received multiplexed image data to the transmission line, (2) a separator for separating the frame signal transmitted from the transmission line into image data for the respective logical channels, (3) an A/D converter for converting analog image data to digital image data to be transmitted, (4) a memory for storing the digital image data converted by the A/D converter, (5) an image encoder for encoding the digital image data, (6) a multiplexer for being input the coded image data and the separated image data which is separated by the separator, multiplexing these image data by inserting the coded image data into a designated logical channel, and outputting the multiplexed image data to the line interface portion, and (7) a control unit for controlling the multiplexer so as to insert the coded image data into a predetermined logical channel in accordance with an instruction for image transmission. According to the image transmitting apparatus having the above-described structure, an image exchange is obviated.

An image receiving apparatus provided in a third aspect of the present invention comprises (1) a line interface portion for receiving a frame signal composed of multiplexed image data of a plurality of logical channels from a transmission line, separating and outputting the image data of the logical channel which is allotted to the image receiving apparatus, (2) a synchronization detector for detecting synchronization and abnormal synchronization on the basis of the synchronizing data which is added to image data, (3) a decoder for decoding coded image data, (4) a memory for storing the image data for at least one picture which is output from the decoder, (5) a control unit for freezing or releasing freeze depending upon whether the signal output from the synchronization detector is an abnormal synchronization signal or a normal synchronization signal, (6) a selector for selecting the image data output from the decoder when synchronization is detected, while selecting the image data read from the memory when synchronization is abnormal, and (7) a D/A converter for converting the digital image data output from the selector to analog image data. According to this image receiving apparatus, it is possible to receive and display the image transmitted from a predetermined image transmitting apparatus. In addition, even if abnormal synchronization is caused, since the preceding image is displayed (which is called 'freeze'), there is no display distortion.

Other features and advantages of the present invention will be apparent from the following description taken in conjunction with the accompanying drawings.

DESCRIPTION OF THE PREFERRED EMBODIMENTS

(A) Structure of a Monitoring System of the Present Invention

Figure 1:
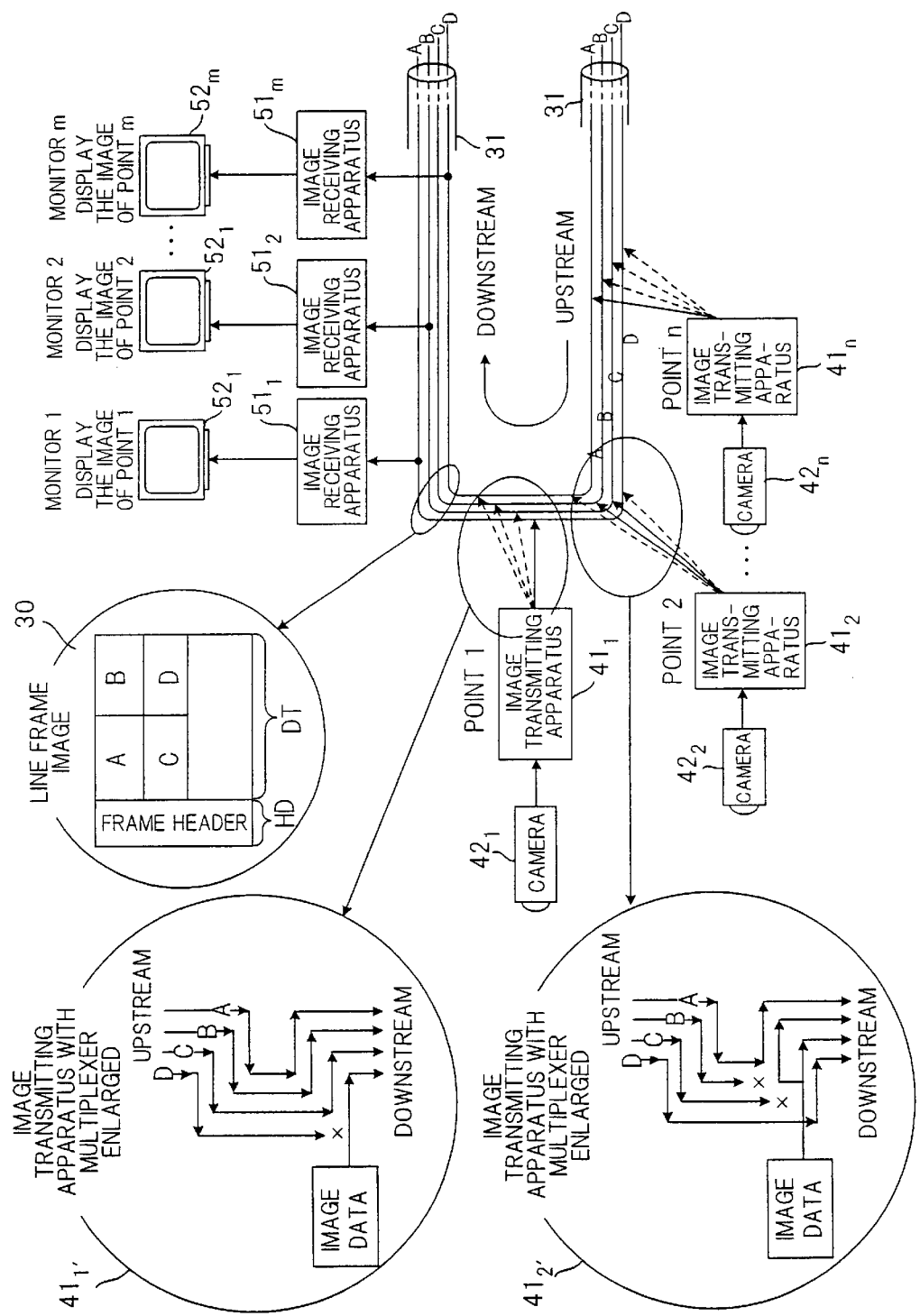
FIG. 1 shows the structure of a monitoring system according to the present invention.

FIG. 1 shows the structure of a monitoring system according to the present invention. The reference numeral 31 represents a transmission line for transmitting image data. A plurality of logical channels A to D are set on the transmission line 31. More specifically, a plurality of virtual lines called logical channels are set on the one physical line (transmission line), and image data is multiplexed and transmitted through each of the logical channels. The number of logical channels shown in FIG. 1 is only an example, and it is not limited to four; A, B, C and D. The frame signal to be transmitted is provided with a header portion HD and a data portion DT, as shown in a line frame image 30. The image data are inserted to the positions corresponding to the logical channels A to D of the data portion DT, and the image data on the plurality of logical channels A to D are multiplexed and transmitted.

A plurality of image transmitting apparatuses $41_1$ to $41_n$ are connected to the image transmitting side of the transmission line 31, and cameras $42_1$ to $42_n$ are attached to the corresponding image transmitting apparatuses $41_1$ to $41_n$. A plurality of image receiving apparatuses $51_1$ to $51_m$ are connected to the image receiving side of the transmission line 31, and monitors $52_1$ to $52_m$ are attached to the corresponding image receiving apparatuses $51_1$ to $51_m$.

Predetermined logical channels A to D are fixedly allotted to the image receiving apparatuses $51_1$ to $51_m$, respectively. On the other hand, the logical channels A to D are not fixedly allotted to the image transmitting apparatuses $41_1$ to $41_n$, so that image may be transmitted to any image receiving apparatus through any logical channel.

Figure 12:
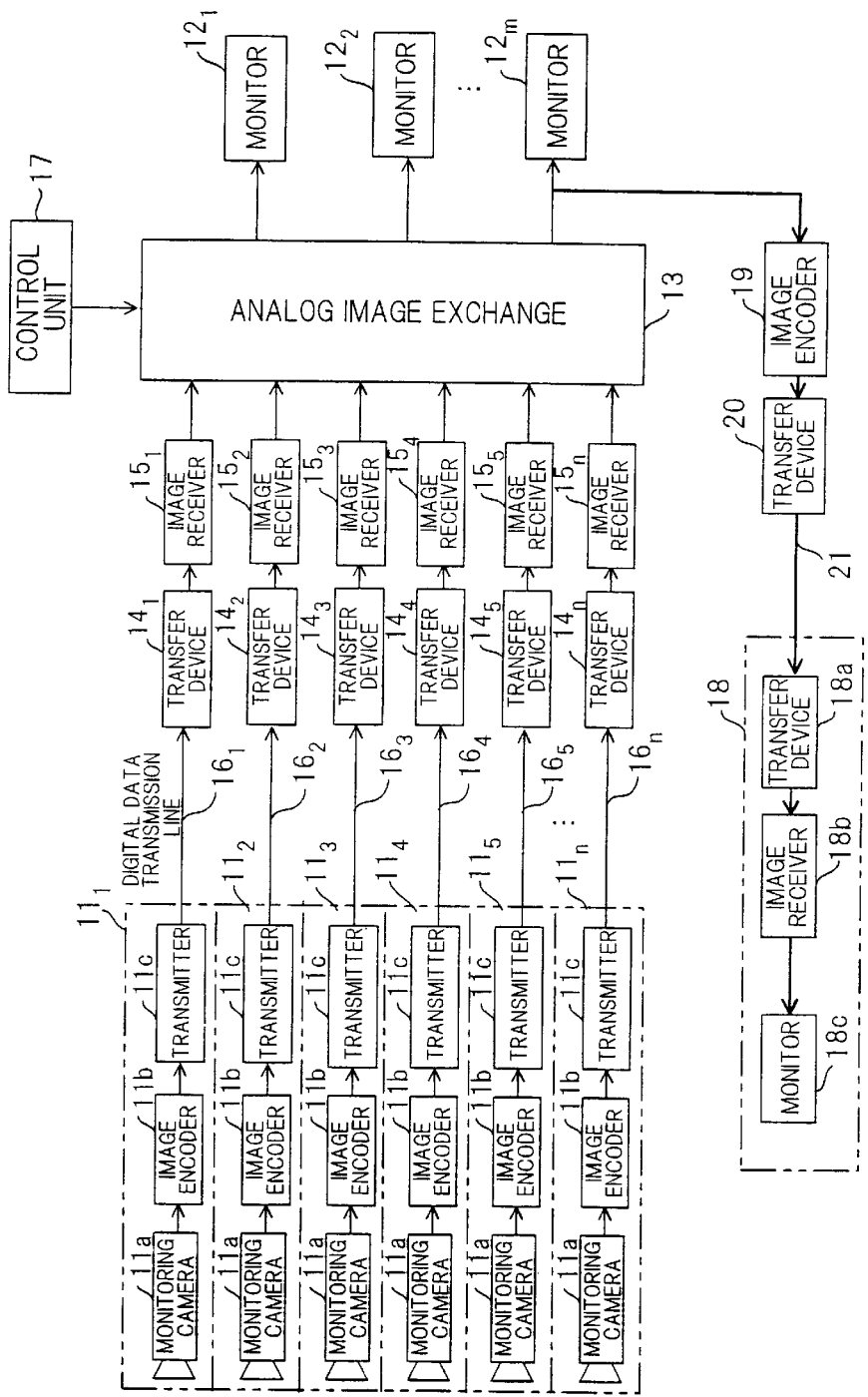
FIG. 12 shows the structure of another conventional monitoring system.
Figure 13:
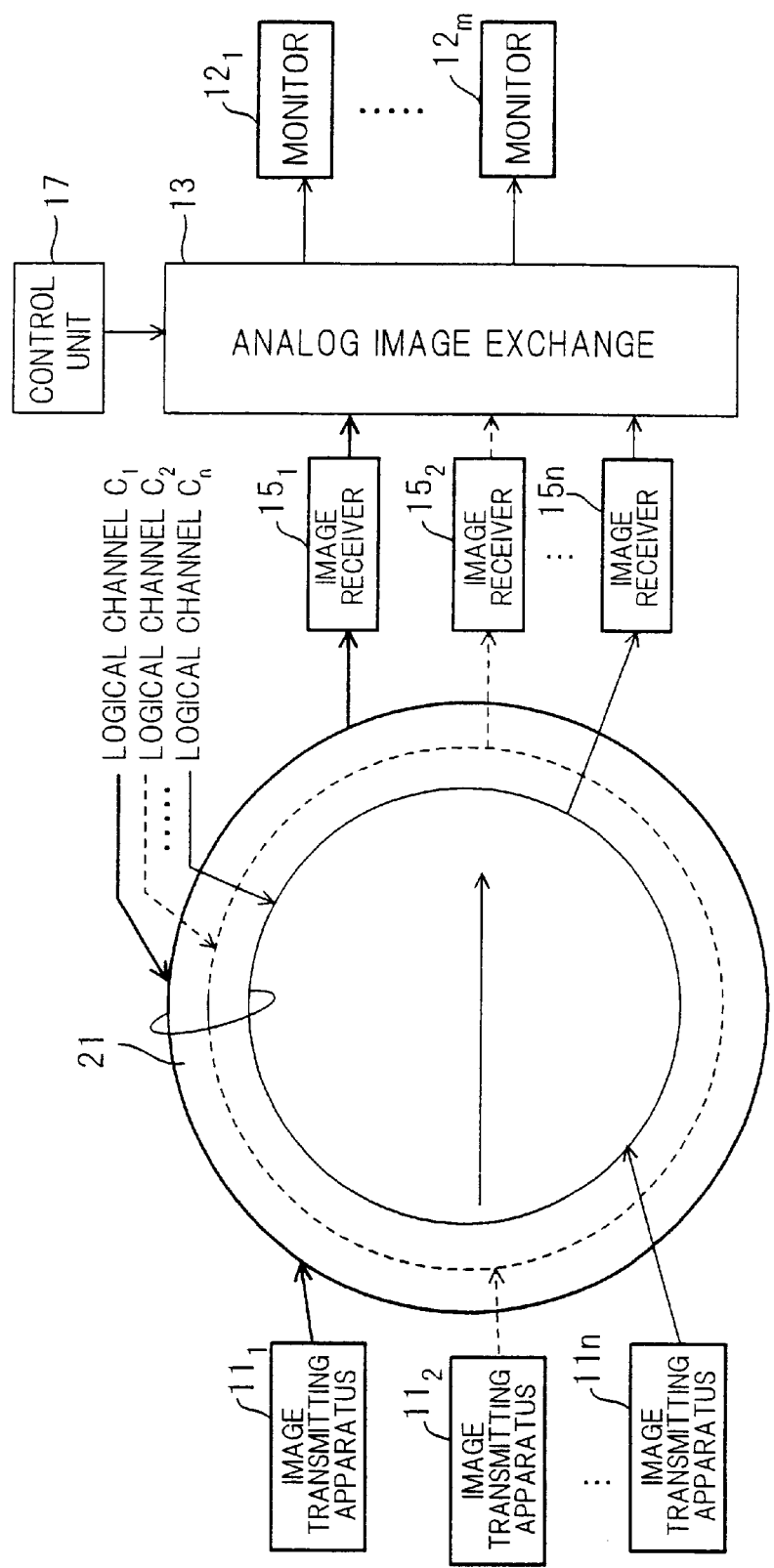
FIG. 13 shows the structure of a monitoring system provided with an annular transmission line.

In a conventional system, the path fixedly connects an image transmitting apparatus to an image receiving apparatus in one-to-one correspondence (see FIG. 12). This structure, however, requires an image exchange in order to display the image caught by an optional camera on an optional monitor. In contrast, according to the present invention, it is possible to transmit an image from any of the image transmitting apparatuses $41_1$ to $41_n$ to any of the image receiving apparatuses $51_1$ to $51_m$ without the need for providing an image exchange. For this purpose, although predetermined logical channels A to D are fixedly allotted to image receiving apparatuses $51_1$ to $51_m$, respectively, the image transmitting apparatuses $41_1$ to $41_n$ remain usable to any logical channel. As described above, since the image transmitting apparatuses $41_1$ to $41_n$ use the logical channels in common, they are capable of freely transmitting an image to any of the image receiving apparatuses $51_1$ to $51_m$ through any logical channel, thereby realizing an image exchange function and a multiplex function. Furthermore, it is possible that one image transmitting apparatus transmits an image via a plurality of logical channels at the same time.

Each of the image transmitting apparatuses $41_1$ to $41_n$ transmits image data through a predetermined one of the logical channels A to D in the following manner. For example, it is now assumed that the image transmitting apparatus $41_1$ provided at a point 1 transmits the image created by its own apparatus through the logical channel D. The image transmitting apparatus $41_1$ receives the frame signal which is transmitted from the upstream through the transmission line 31, multiplexes the image data created by its own apparatus with the received frame signal by replacing the image data of the logical channel D in the received frame signal with the created image data so as to form a new frame signal, and transmits the new frame signal to the transmission line. Further, if it is assumed that the image transmitting apparatus $41_2$ provided at a point 2 transmits the image created by its own apparatus through the logical channels B and C, the image transmitting apparatus $41_2$ receives the frame signal which is transmitted from the upstream through the transmission line 31, multiplexes the image data created by its own apparatus with the received frame signal by replacing the image data of the logical channels B and C in the received frame signal with the created image data so as to form a new frame signal, and transmits the new frame signal to the transmission line.

That is, if one of the image transmitting apparatuses $41_1$ to $41_n$ does not transmit the image created by its own apparatus to any of the image receiving apparatuses $51_1$ to $51_m$, it transmits the image signal received from the upstream as it is. On the other hand, if it transmits the image created by its own apparatus through a designated logical channel, it replaces the image data of the designated logical channel in the image signal received from the upstream with the image data created by its own apparatus, while outputting the image data received from the upstream through the other logical channels as they are.

As described above, according to the monitoring system of the present invention, since the logical channels are not allotted fixedly to any of the image transmitting apparatuses $41_1$ to $41_n$, if it is assumed that the band which is necessary for one image (one logical channel) is F, and the number of image transmitting apparatuses is n, the construction of the system in which F×n exceeds the maximum transmission band Fmax of the transmission line 31 is enabled.

In addition, it is possible to transmit the image from an optional image transmitting apparatus to an optional image receiving apparatus by instructing the ON/OFF of image transmission to each logical channel.

It is also possible to display an image at a plurality of points at the same time by connecting a plurality of image receiving apparatuses to one logical channel, namely, by allotting one logical channel to a plurality of image receiving apparatuses.

Figure 2:
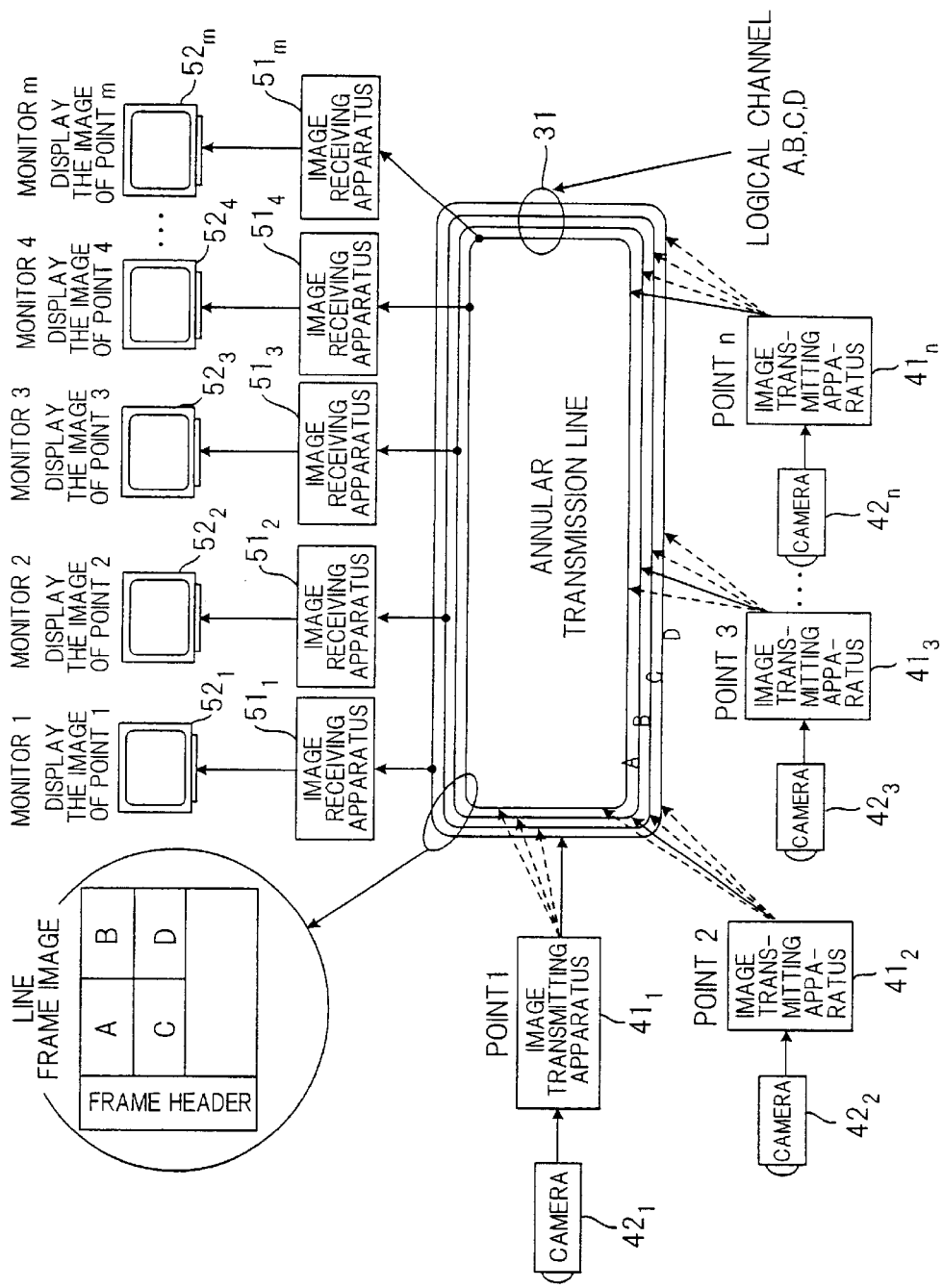
FIG. 2 shows the structure of a monitoring system having an annular transmission line.

FIG. 2 shows a modification of the monitoring system shown in FIG. 1. In this modification, the transmission line 31 is an annular transmission line. The same reference numerals are provided for the elements which are the same as those shown in FIG. 1.

Figure 3:
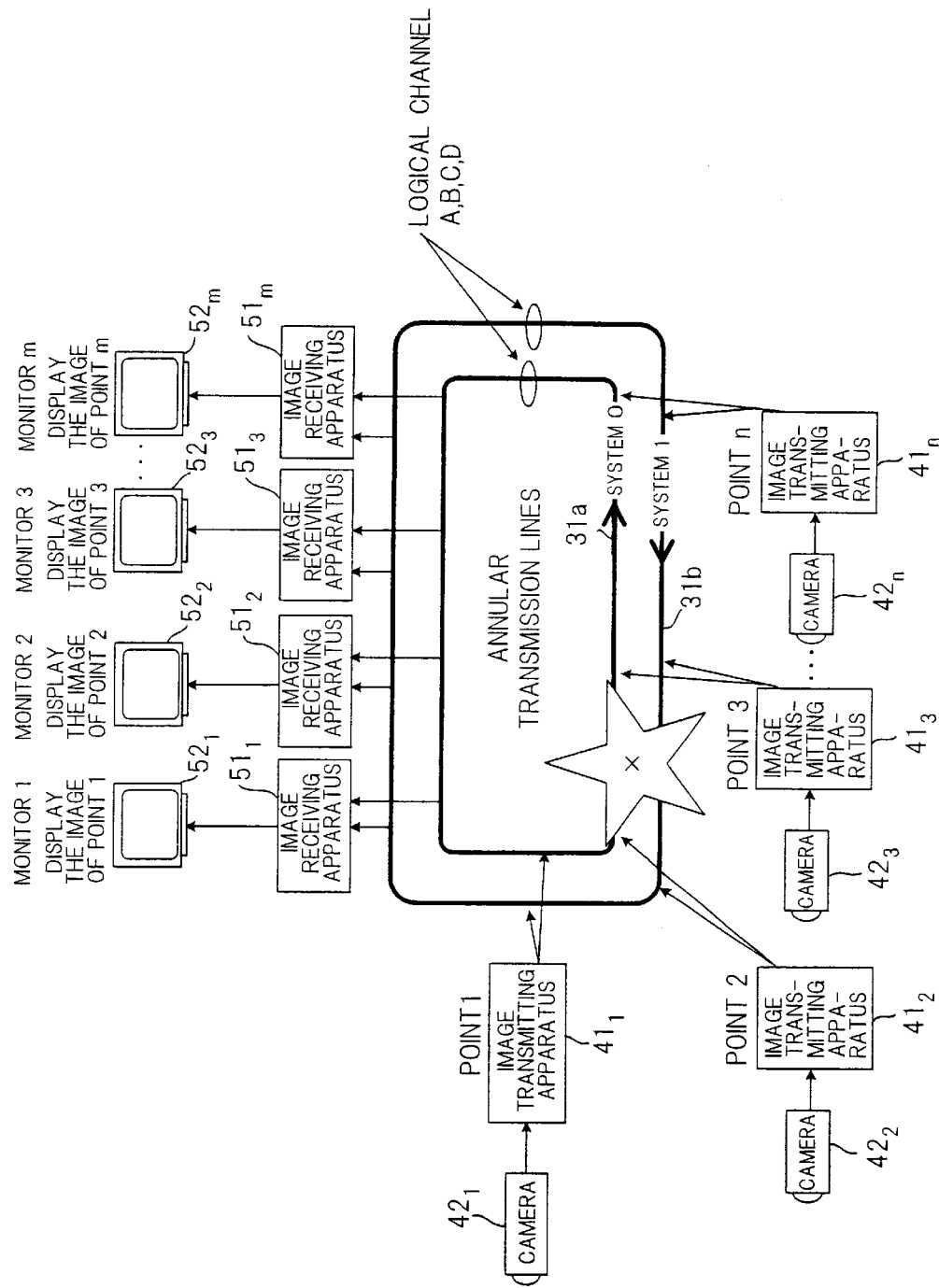
FIG. 3 shows the structure of a monitoring system having double annular transmission lines.

FIG. 3 shows a modification of the monitoring system shown in FIG. 2. In this modification, double annular transmission lines are provided. The same reference numerals are provided for the elements which are the same as those shown in FIG. 2. The monitoring system shown in FIG. 3 is different from that shown in FIG. 2 in that (1) the annular transmission line 31 is substituted by a first annular transmission line 31$a$ (system 0 transmission line) for transmitting a multiplex image signal (frame signal) counterclockwise, and a second annular transmission line (system 1 transmission line) 31$b$ for transmitting the multiplex image signal clockwise, in that (2) the image transmitting apparatuses $4_1$ to $4_1$ and the image receiving apparatuses $51_1$ to $51_m$ are connected to each of the annular transmission lines 31$a$ and 31$b$, and in that (3) each of the annular transmission lines 31$a$ and 31$b$ is provided with a plurality of logical channels A to D.

When the monitoring system is operated, each of the image transmitting apparatuses $41_1$ to $41_n$ multiplexes the image data to be transmitted by inserting the image data in a designated logical channel and transmits the newly created multiplexed image data to the first and second annular transmission lines 31$a$ and 31$b$. Each of the image receiving apparatuses $51_1$ to $51_m$ receives the multiplexed image data from the first transmission line (system 0 transmission line) 31$a$ when the transmission line 31$a$ is normal, but when it is impossible to receive the correct data from the first transmission line 31$a$, it receives the multiplexed image data from the second transmission line (system 1 transmission line) 31$b$.

Owing to this structure, even if a trouble is caused on either of the transmission lines 31$a$ and 31$b$, or both of them, as shown in FIG. 3, each of the image receiving apparatuses $51_1$ to $51_m$ is capable of receiving and displaying an image continuously.

Figure 4:
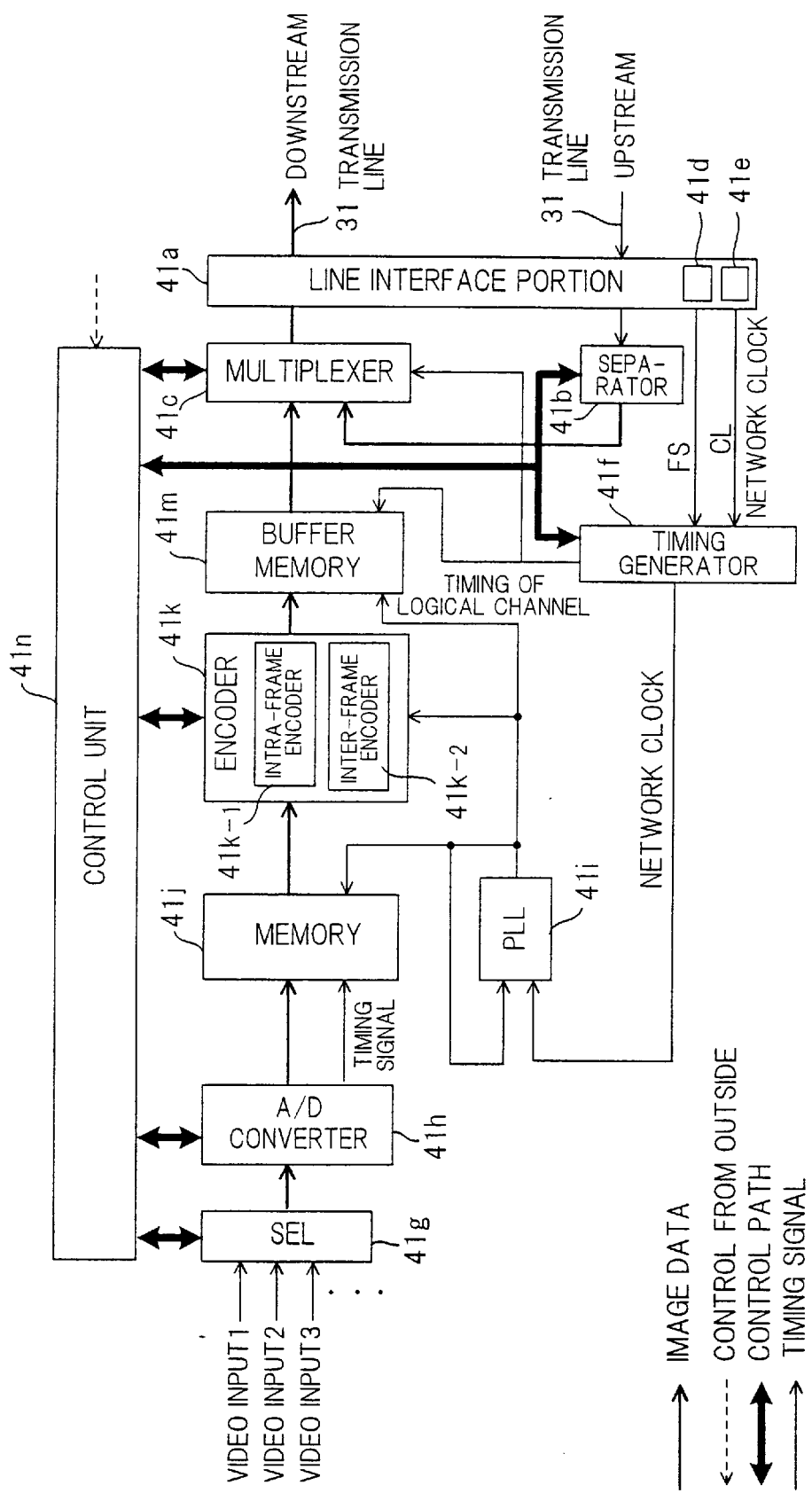
FIG. 4 shows the structure of an image transmitting apparatus.

(B) Image Transmitting Apparatus and Image Receiving Apparatus In a First Embodiment (a) Structure of image transmitting apparatus FIG. 4 shows the structure of an image transmitting apparatus which is applicable to the monitoring systems shown in FIGS. 1 and 2. A line interface portion 41$a$ as an interface with a network (transmission line) receives a frame signal composed of multiplexed image data on the logical channels from the upstream of a transmission line 31, and outputs it to a separator 41$b$. The line interface portion 41$a$ also transfers a frame signal composed of the multiplex image data input from a multiplexer 41$c$ to the downstream of the transmission line 31. The line interface portion 41$a$ includes a synchronization detector 41$d$ for detecting a frame synchronization and outputting a frame synchronizing signal FS, and a network clock extractor 41$e$ for extracting and outputting a network clock CL. If an optical interface is used as the line interface portion 41$a$, long-distance transmission is enabled.

The separator 41$b$ separates the frame signal input from the upstream of the transmission line 31 into the image data for each logical channel, and inputs the separated image data into the multiplexer 41$c$. A timing generator 41$f$ outputs a timing signal to be supplied to each element by using the network clock CL and the frame synchronizing signal FS output from the line interface portion 41$a$. Examples of a timing signal are a signal corresponding to the network clock CL, and a signal (logical channel timing signal) corresponding to a logical channel.

A selector 41$g$ selects a video signal from among a plurality of video signals which are output from a plurality of cameras (if the video signal input is only one, this process is unnecessary). An A/D converter 41$h$ converts analog video signal to digital video signal (image data). A PLL portion 41$i$ generates a clock which is synchronous with the network clock CL and outputs the clock to each element. A memory 41$j$ stores image data at the clock pulse input from the A/D converter 41$h$, and outputs the image data in synchronism with the network clock CL output from the PLL portion 41$i$. In this manner, since the memory 41$j$ outputs the image data in synchronism with the network clock CL, the clock pull-in operation is dispensed with at the time of switching a displayed image, so that it is possible to shorten the time necessary for displaying an image. In addition, since the memory 41$j$ outputs the image data in synchronism with the network clock CL, even if any of the video signals is freely selected by the selector 41$g$, the continuous operation of the memory 41$j$ as to an encoder 41$k$ is ensured.

The encoder 41$k$ is provided with an intra-frame encoder 41$k$-1 and an inter-frame encoder 41$k$-2. The intra-frame encoder 41$k$-1 encodes an image data of a picture as interest separately from another picture. In contrast, the inter-frame encoder 41$k$-2 encodes the image data of a picture as interest by utilizing another picture. In other words, there are two encoding modes; an intra-frame encoding mode and an inter-frame encoding mode. The encoder 41$k$ encodes an image data by appropriately switching these two modes. Sometimes, the encoder 41$k$ separates one picture into a plurality of blocks, and partially adopts the intra-frame encoding mode.

A buffer memory $41_m$ plays a role as a buffer between the encoder 41$k$ and the multiplexer 41$c$. More specifically, the buffer memory $41_m$ temporarily stores the image data encoded by the encoder 41$k$, and inputs the image data to the multiplexer 41$c$ at a timing of a designated logical channel. The multiplexer 41$c$ outputs the image data from the buffer memory $41_m$ at the timing of a logical channel which is designated to be ON by a control unit 41$n$, outputs the image data from the separator 41$b$ at the timing of a logical channel which is designated to be OFF, and multiplexes the video image. That is, since the multiplexer 41$c$ is instructed to transfer (ON) the image or not (OFF) for each channel, it outputs (multiplexes) the image data created by its own apparatus at the timing of the logical channel which is designated to be ON, while outputting the image data from the separator 41 as it is at the timing of the logical channel which is designated to be OFF.

The control unit 41$n$ controls each element in accordance with the instruction from the center. That is, each element works in accordance with the instruction from the control unit 41n. For example, the selector 41g switches the inputs of the cameras in accordance with the instruction for selecting a video input from the control unit 41n. The A/D converter 41h executes A/D conversion in accordance with the instruction for setting the sampling speed, the number of bits of conversion, etc. from the control unit 41n. The multiplexer 41c multiplexes an image data created by its own apparatus with the separated image data from the separator 41b in accordance with the ON/OFF instruction to each logical channel from the control unit 41n.

The encoder 41k switches the encoding mode in accordance with the instruction from the control unit 41n. Since the image data encoded in the intra-frame encoding mode are not dependent on the preceding picture, it is possible to immediately decode and display the picture using the decoded image data. In contrast, since the image data encoded in the inter-frame encoding mode are dependent on the preceding frame, it is impossible to decode the coded image data until the image data of the intra-frame encoding mode are received, so that the display of an image is delayed. Consequently, at the time of starting image transmission, or switching an image, it is impossible for the image receiving apparatus to display an image until image data of the intra-frame encoding mode arrive, so that the display of an image is delayed. To prevent this, in this embodiment, when the control unit 41n receives the instruction for starting image transmission or switching an image from the center, the control unit 41n instructs the encoder 41k to operate in the intra-frame encoding mode, and after a predetermined period of time, the control unit 41n instructs the encoder 41k to return the mode to the original mixed mode. In this manner, the image transmitting apparatus is capable of instantly displaying an image without a temporal display.

Figure 5:
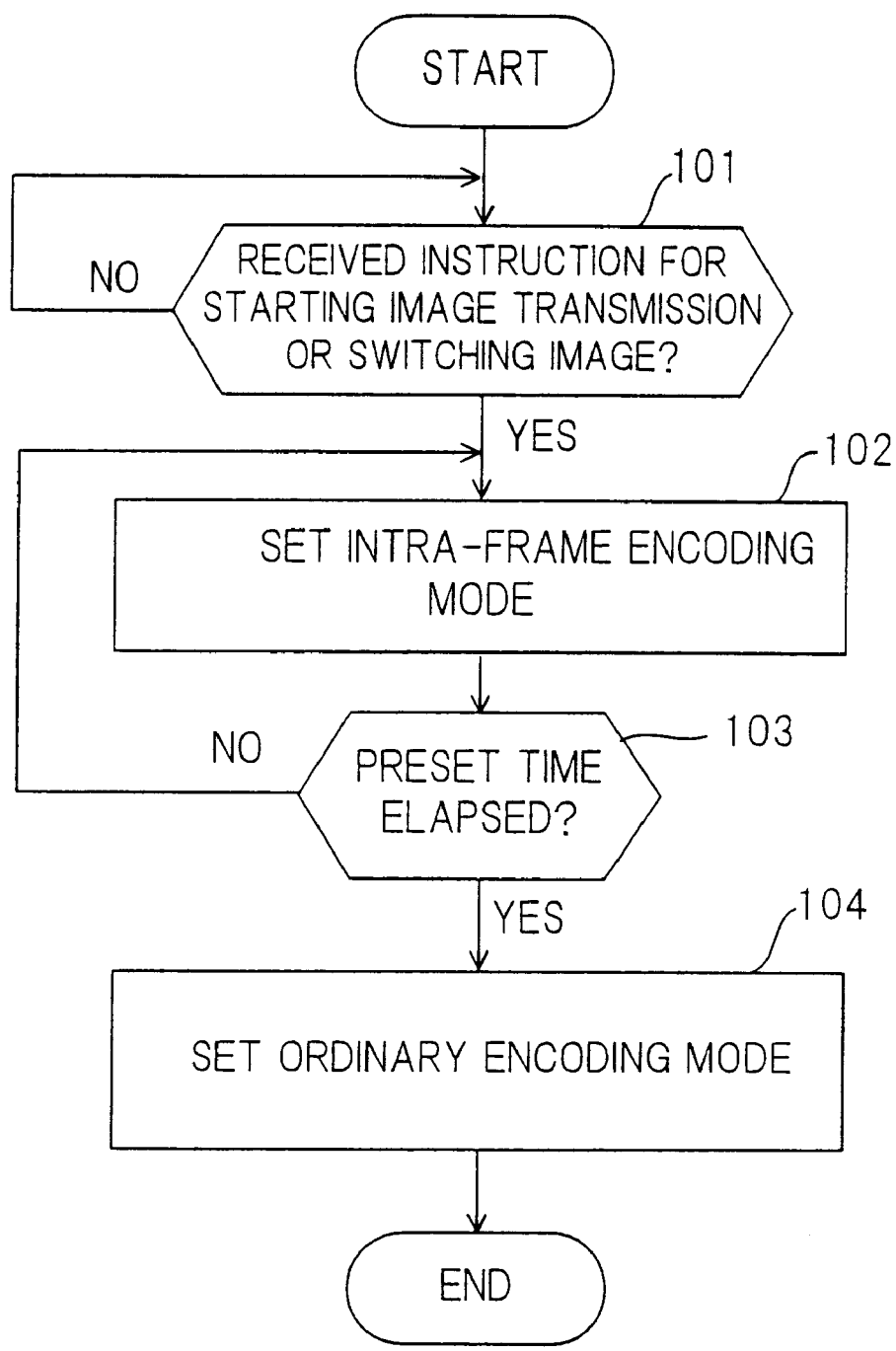
FIG. 5 is a flow chart of the method of controlling a change of the encoding mode.

FIG. 5 is a flow chart of the method of controlling a change of the encoding mode.

The control unit 41n judges whether or not an instruction for starting image transmission or switching an image from the outside (center) is issued (step 101), and if the answer is in the affirmative, the control unit 41n instructs the encoder 41k to encode the image data in the intra-frame encoding mode (step 102). Thereafter, the control unit 41n judges whether or not the preset time has elapsed (step 103), and instructs the encoder 41k to continue encoding in the intra-frame encoding mode until the preset time has elapsed. If the preset time has elapsed, the control unit 41n instructs the encoder 41k to change the mode into an ordinary mixed encoding mode, which is an appropriate mixture of the intra-frame encoding mode and the inter-frame encoding mode (step 104).

Figure 6:
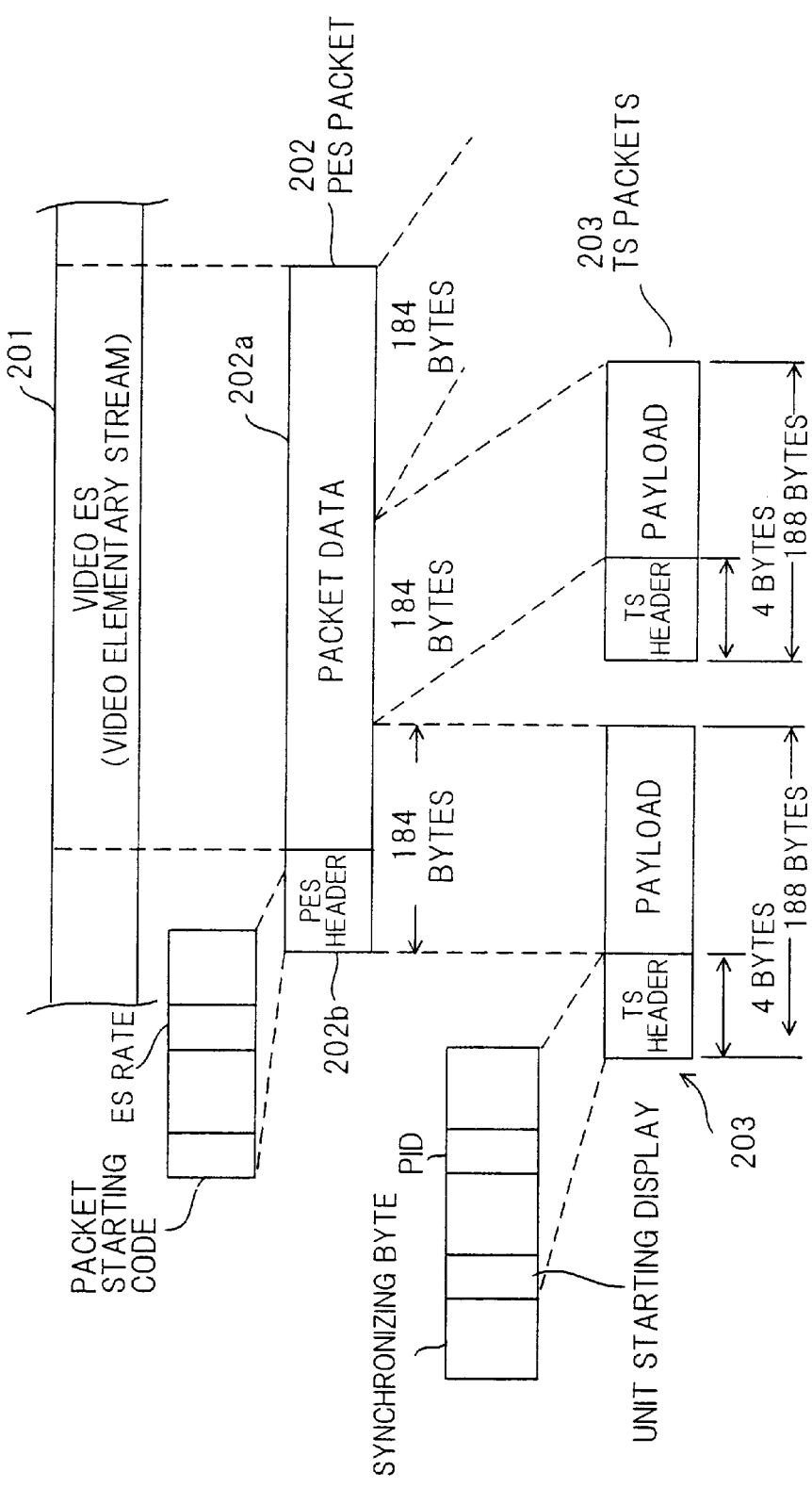
FIG. 6 is an explanatory view of a video elementary stream.

FIG. 6 shows an example of the structure of video data (image data). This is the structure of an MPEG-2 TS (transport stream). A video ES (elementary stream) 201 is separated into packet data 202a of a predetermined size, and a PES (packetized elementary stream) header 202b is attached to the head of each packet data so as to form a PES packet 202. The PES header 202b includes a packet start code, an ES rate, etc. The PES packet 202 is further separated into payloads of 184 bytes, and a TS header of 4 bytes is added to the head of each payload so as to form a TS packet 203 of 188 bytes. The TS header includes a synchronizing byte, a unit starting display bit, and an ES identifier PID. A formatter (not shown) converts the image data stored in the buffer memory 41m to the format shown in FIG. 6, and inputs the format to the multiplexer 41c. The multiplexer 41c inserts the input image data having a TS packet structure to the position corresponding to the logical channel designated by the control unit 41n.

(b) Structure of Image Receiving Apparatus

Figure 7:
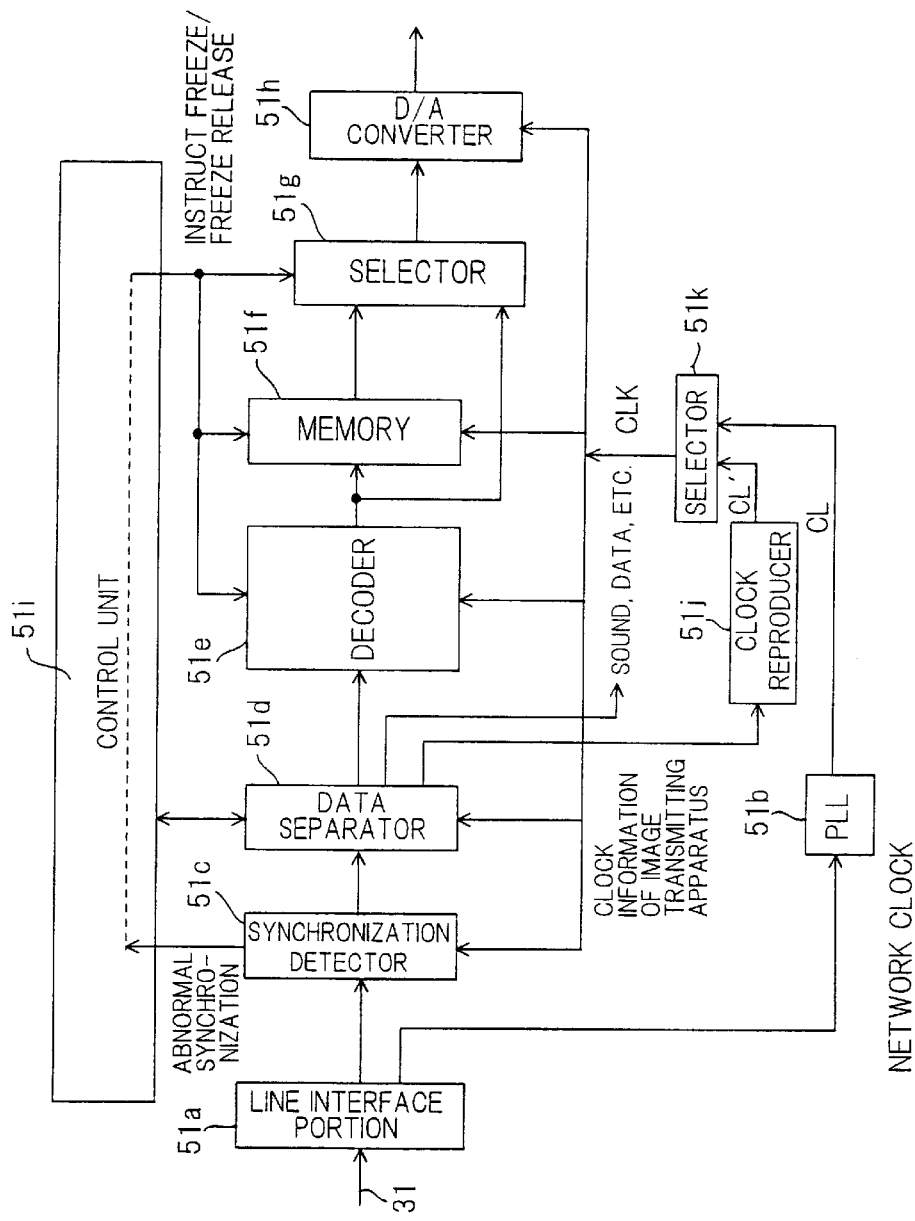
FIG. 7 shows the structure of an image receiving apparatus.

FIG. 7 shows the structure of an image receiving apparatus which is applicable to the monitoring systems shown in FIGS. 1 and 2.

A line interface portion 51a receives a frame signal which is composed of multiplexed image data of a plurality of logical channels from the transmission line 31, and separates and outputs the image data of the logical channel which is allotted to its own apparatus. The line interface portion 51a also extracts the network clock CL. If an optical interface is used as the line interface portion 51a, long-distance transmission is enabled, as is the case with the line interface portion 41b of the image transmitting apparatus. A PLL portion 51b generates an internal clock CL which is synchronous with the network clock, and a synchronization detector 51c detects synchronization or a synchronization, and protects synchronization on the basis of the synchronizing data which is added to the head of the image data received by the line interface portion 51a.

Figure 8:
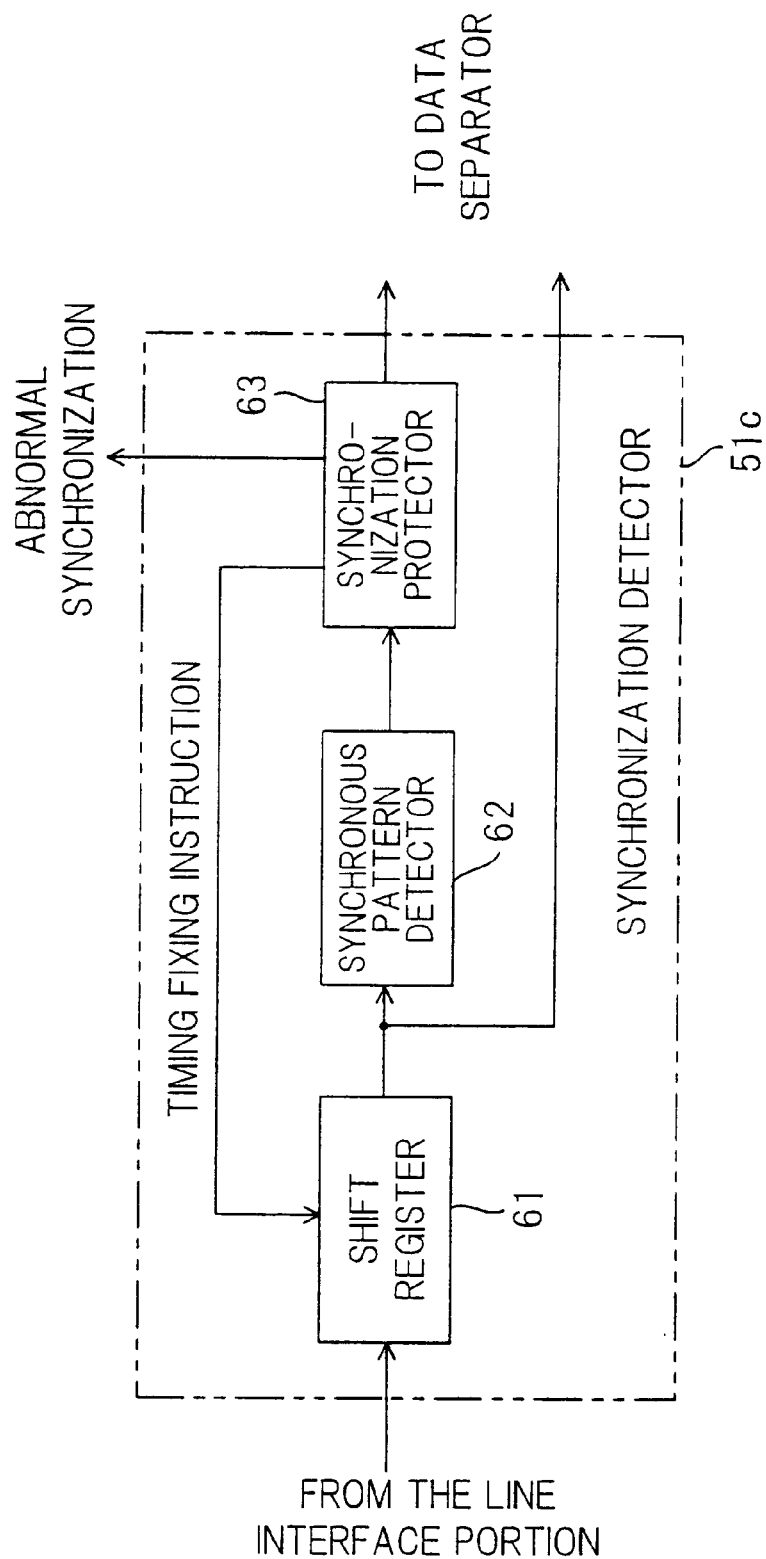
FIG. 8 shows the structure of a synchronization detector.

FIG. 8 shows the structure of the synchronization detector 51c. A shift register 61 having an n-bit length shifts the bit-serial image data which is input from the line interface portion 51a by one bit before storing it, and outputs n bits of data in parallel (serial/parallel conversion). A synchronous pattern converter 62 detects synchronization when the content of the shift register 61 agrees with a synchronous pattern. A synchronization protector 63 stores the timing at which synchronization is detected, and protects synchronization by using the stored timing as the timing of synchronization detection when synchronization is not detected. The synchronization protector 63 outputs abnormal synchronization signal when synchronization has not been detected continuously a predetermined number of times. When the abnormal synchronization signal is output, the image is frozen, as will be described later, so as to prevent display distortion on a monitor. On the other hand, while synchronization is established, the synchronization protector 63 inputs a timing fixture instruction signal to the shift register 61. When the shift register 61 receives this signal, it outputs parallel data in accordance with the output timing of the parallel data.

Returning to FIG. 7, the data separator 51d separates image, sound, and data from one another when they are multiplexed. A decoder 51e decodes compressed image data to the original image data, and inputs the decoded image data to a memory 51f and a selector 51g. The memory 51f stores the image data at least for the preceding one picture. The selector 51g selects the image data output from the decoder 51e when synchronization is normal. On the other hand, when abnormal synchronization occurs, the selector 51g repeatedly outputs the preceding image stored in the memory 51f (freeze of the preceding image) until normal synchronization is detected. A D/A converter 51h converts digital image data to analog image data and outputs the analog image data to a monitor.

Abnormal synchronization is detected by the synchronization detector 51c, as described above, which supplies an abnormal synchronization signal to a control unit 51i. When the control unit 51i is informed of abnormal synchronization, it inputs an instruction for freeze to the decoder 51e, the memory 51f and the selector 51g. When then instruction is received, the memory 51f holds the preceding image, and the selector 51g outputs the preceding image stored in the memory 51f. When synchronization is detected to be normal, the controller 51i outputs an instruction for freeze release to the memory 51f and the selector 51g. Each element then resumes the normal operation.

In this manner, it is possible to prevent display distortion on a monitor. In addition, since abnormal synchronization is detected on the output side of the line interface portion 51a in good time, it is possible to prevent display distortion with certainty. In contrast, in the prior art, an image is frozen when an error is caused in the decoding of image data, freeze is delayed, which leads to display distortion.

A clock reproducer 51j reproduces a clock on the basis of the clock information (clock reference) received from the image transmitting apparatus which is obtained from the data separator 51d, so as to synchronize the clock of the image transmitting apparatus and the clock of the image receiving apparatus. This operation is capable of preventing a picture from skipping. (This is adopted in a coding system of an MPEG or the like). The PLL portion 51b generates a clock CL which is synchronous with the network clock. A selector 51k selects either of the network clock CL and the clock CL' which is reproduced from the clock reference of the image transmitting apparatus, and outputs the selected clock as an internal clock CLK.

It is not realistic to synchronize the clocks among the image transmitting apparatuses. Accordingly, when image data is newly received from an image transmitting apparatus, it is necessary to generate a clock CL' which is synchronous with the clock of the image transmitting apparatus on the basis of the clock reference, so that it takes a long time for pull in. To prevent this, in the present invention, by placing much importance on the fact that the clock in each image transmitting apparatus is synchronous with the network clock CL, the network clock is adopted as the internal clock CLK. In this manner, pull in is obviated, thereby preventing a picture from skipping. Consequently, the selector 51k usually outputs the network clock CL as the internal clock CLK. On the other hand, when the network clock of the image transmitting apparatus and that of the image receiving apparatus are not synchronous, the selector 51k outputs the clock CL' generated on the basis of the clock reference as the internal clock CLK.

Figure 9:
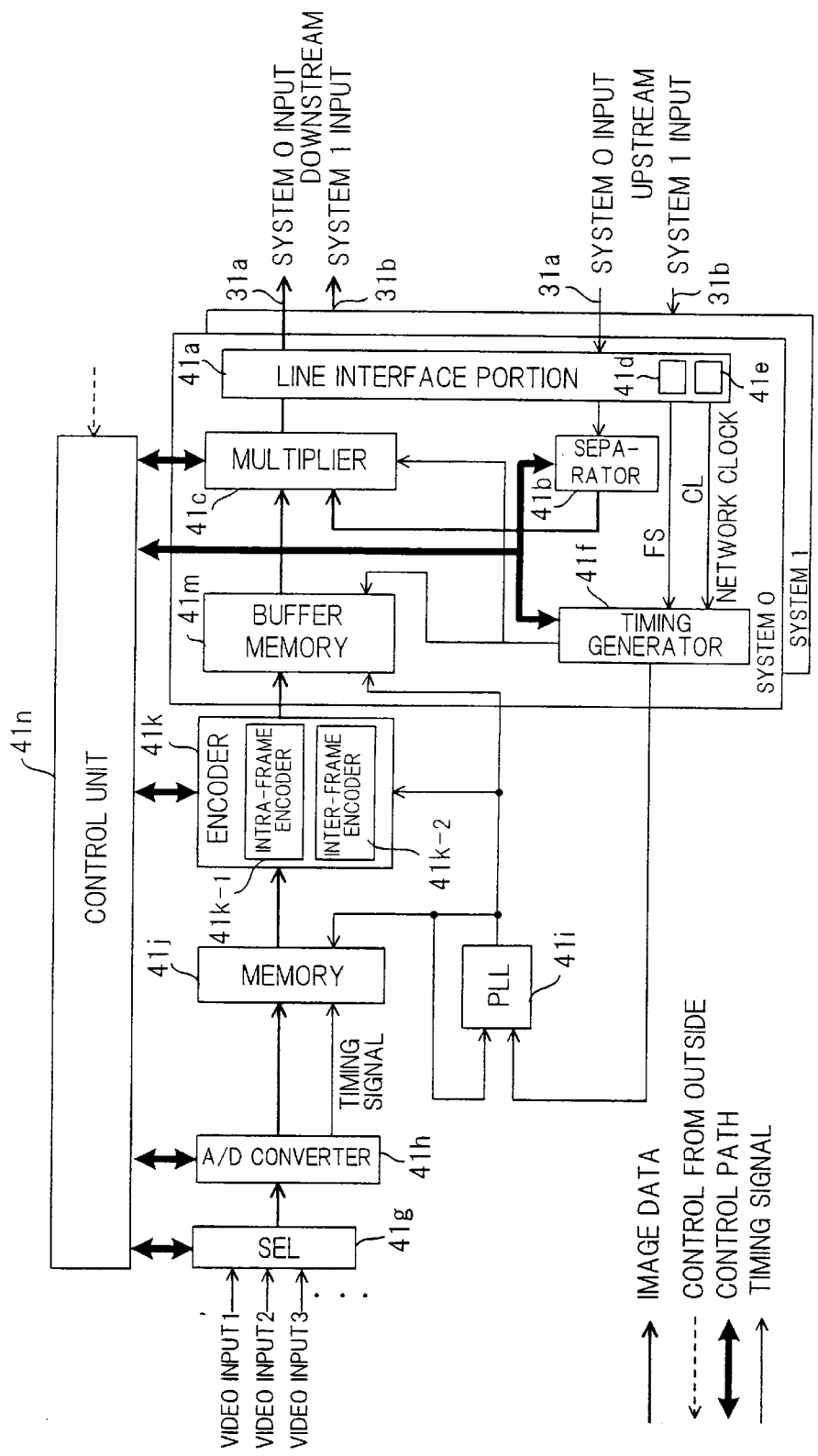
FIG. 9 shows the structure of another image receiving apparatus.

(C) Image Transmitting Apparatus and Image Receiving Apparatus in a Second embodiment (a) Structure of Image Transmitting Apparatus FIG. 9 show the structure of an image transmitting apparatus. The image transmitting apparatus is applicable to the monitoring system having double annular transmission lines shown in FIG. 3. The same reference numerals are provided for the elements of which are the same as those of the image transmitting apparatus shown in FIG. 4. This embodiment is different from that shown in FIG. 4, in that the line interface portion 41a, the separator 41b, the multiplexer 41c, the timing generator 41f, and the buffer memory 41m are provided for each of a system 0 transmission line 31a and a system 1 transmission line 31b, and in that the other elements are provided in common for the system 0 transmission line 31a and the system 1 transmission line 31b.

The encoder 41k encodes the image data to be transmitted and stores it in the buffer memories 41m of both transmission lines 31a and 31b, and the multiplexer 41b of both transmission lines 31a and 31b insert the image data stored in the buffer memories 41m into the positions corresponding to the designated logical channels, and supply the multiplexed image data to the system 0 transmission line 31a and the system 1 transmission line 31b, respectively.

(b) Structure of Image Receiving Apparatus

Figure 10:
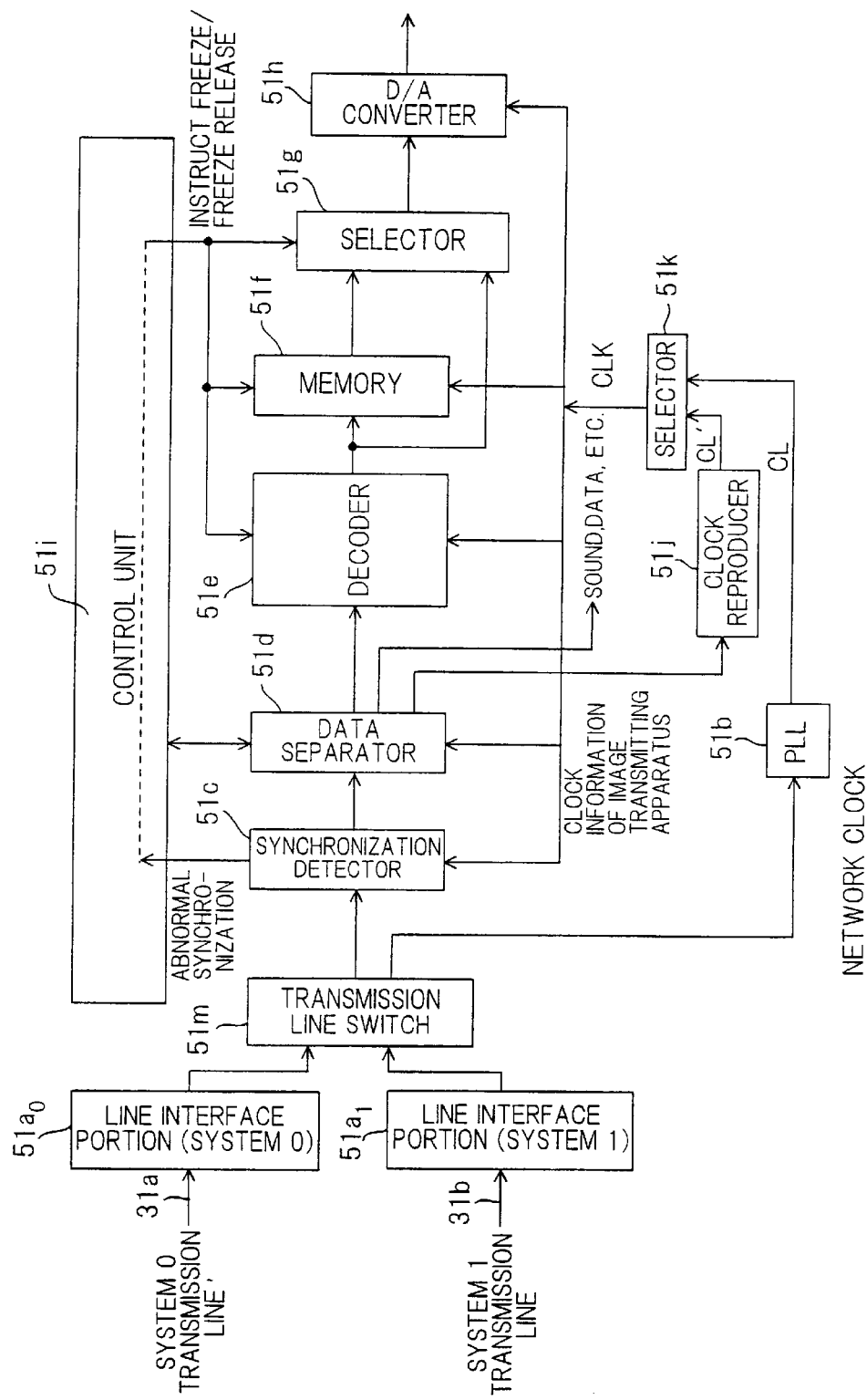
FIG. 10 shows the structure of still another image receiving apparatus.
Figure 11:
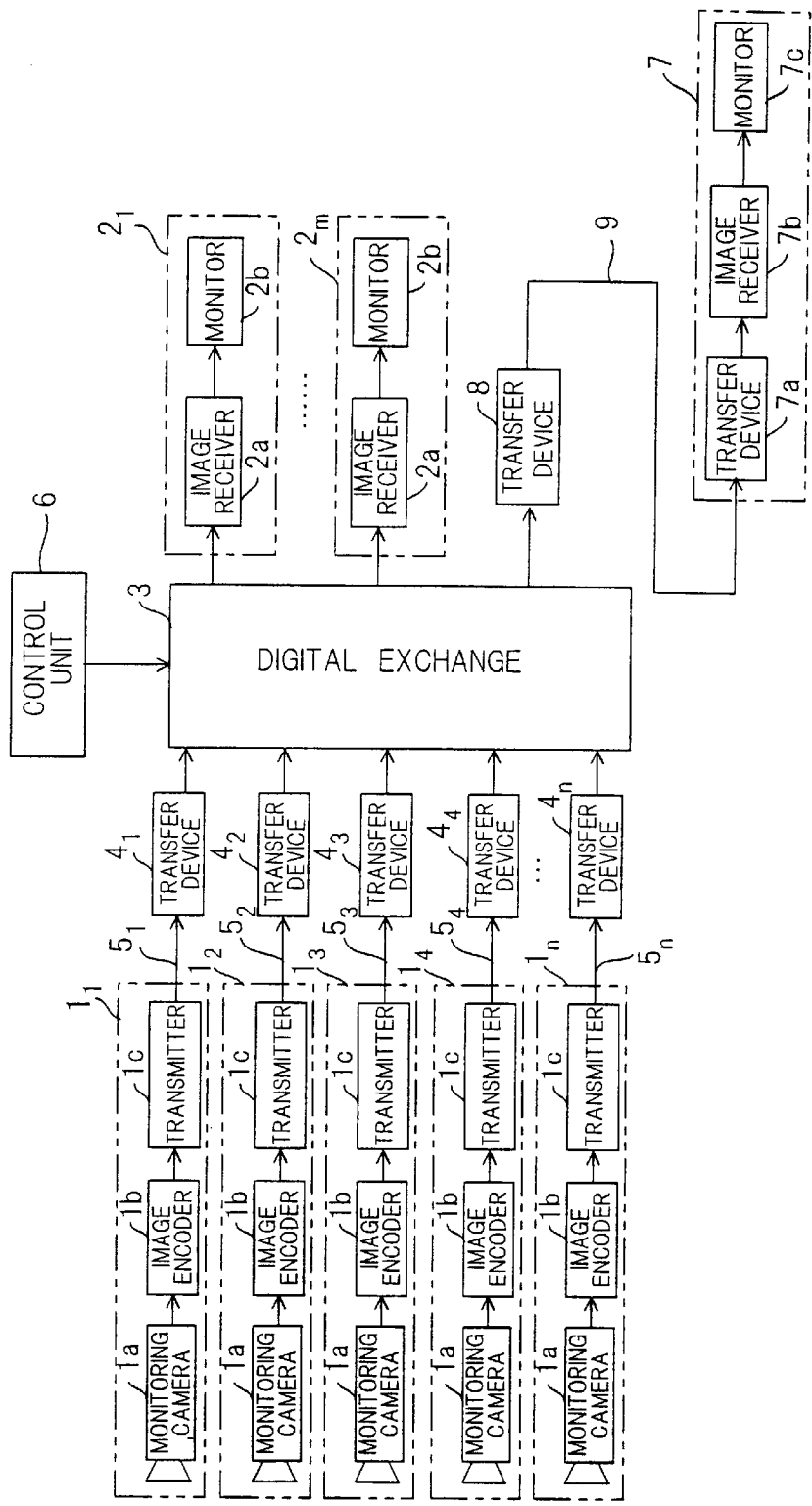
FIG. 11 shows the structure of a conventional monitoring system.

FIG. 10 shows the structure of an image receiving apparatus. The image receiving apparatus is applicable to the monitoring system having double annular transmission lines shown in FIG. 3. The same reference numerals are provided for the elements of which are the same as those of the image receiving apparatus shown in FIG. 7. This embodiment is different from that shown in FIG. 7, in that (1) line interface portions 51a and 51a are provided for the system 0 transmission line 31a and the system 1 transmission line 31b, respectively, and in that (2) a transmission line switch $51_m$ is provided, which detects the normality/abnormality of the line, and selects the image data and the network clock output from the line interface portions $51a_0$ if the system 0 transmission line 31a is normal, while selecting the image data and the network clock output from the line interface portions $51a_1$ if the system 0 transmission line 31a is abnormal.

As described above, according to the present invention, since a plurality of logical channels are provided on the transmission line; a predetermined logical channel is fixedly allotted to each image receiving apparatus and each image transmitting apparatus has a function of transmitting an image to an image receiving apparatus through any logical channel; and each image transmitting apparatus transmits an image to a designated image receiving apparatus through a predetermined logical channel, an image exchange is obviated. In addition, since image receiving apparatuses provided in correspondence to monitors suffice, it is possible to prevent a monitoring system from an increase in size and cost. Furthermore, since it is possible to simultaneously transmit a multiplex image corresponding to the number of logical channels, the construction of the system in which the transmission band of an image x the number of image transmitting apparatuses for one image exceeds the maximum transmission band of the transmission line is enabled.

According to the present invention, one image transmitting apparatus is capable of simultaneously transmitting an image to a plurality of image receiving apparatuses through a plurality of logical channels in accordance with an instruction for image transmission.

According to the present invention, since an encoder of each image transmitting apparatus is provided with an intra-frame coding system and an inter-frame coding system, and image data encoded by the intra-frame coding system are transmitted for a predetermined period of time at the start of image transmission, it is possible to display an image on the monitor of an image receiving apparatus instantly without a temporal delay.

In addition, according to the present invention, since a first annular transmission line for transmitting image data counterclockwise, and a second annular transmission line for transmitting image data clockwise are provided as the transmission line, and an image transmitting apparatus transmits an image through the same logical channel on both annular transmission lines, each image receiving apparatus is capable of receiving and displaying an image continuously, even if a trouble is caused on either or both of the transmission lines.

According to the present invention, image data to be transmitted are inserted to the positions corresponding to designated logical channels and transmitted to the transmission line, an image exchange is obviated.

Furthermore, according to the present invention, an image receiving apparatus receives the image data on the logical channel which is allotted thereto in advance and displays the image on a monitor, and when abnormal synchronization occurs, the image receiving apparatus displays the preceding image, thereby preventing display distortion on the monitor.

As many apparently widely different embodiments of the present invention can be made without departing from the spirit and scope thereof, it is to be understood that the invention is not limited to the specific embodiments thereof except as defined in the appended claims.

What is claimed is:

1. An image transmission method for transmitting an image from an image transmitting apparatus to an image receiving apparatus through a transmission line in accordance with an instruction for image transmission, said method comprising the steps of:

connecting a plurality of image transmitting apparatuses to the image transmitting side of said transmission line, and a plurality of image receiving apparatuses to the image receiving side of said transmission line;

setting a plurality of logical channels on said transmission line;

allotting a predetermined logical channel fixedly to each of said image receiving apparatuses;

providing each of said image transmitting apparatuses with a function of transmitting an image to one of said image receiving apparatuses through any of said logical channels; and transmitting said image to a designated image receiving apparatus through said predetermined logical channel in accordance with said instruction for image transmission.

2. An image transmission method according to claim 1, wherein said image transmitting apparatus simultaneously transmits said image to a plurality of said image receiving apparatuses through said plurality of logical channels in accordance with said instruction for image transmission.

3. An image transmission method according to claim 1, wherein said transmission line includes a first annular transmission line for transmitting image data counterclockwise, and a second annular transmission line for transmitting said image data clockwise, and said image transmitting apparatuses and said image receiving apparatuses are connected to each of said annular transmission lines;

said image transmitting apparatus transmits said image through the same logical channel on both of said annular transmission lines; and said image receiving apparatus receives said image from one of said annular transmission lines when said one annular transmission line is normal, while receiving said image from the other annular transmission line when it is impossible to receive a normal image from said one annular transmission line.

4. An image transmission method according to claim 1, wherein each of said image transmitting apparatuses includes an encoder which is provided with an intra-frame coding system and an inter-frame coding system; and image data encoded by said intra-frame coding system are transmitted for a predetermined period of time at the start of image transmission.

5. An image transmitting apparatus for transmitting an image to an image receiving apparatus through a transmission line in accordance with an instruction for image transmission, comprising:

a line interface portion for receiving a frame signal composed of multiplexed image data of logical channels from said transmission line, and transmitting a frame signal composed of image data to be transmitted from said image transmitting apparatus and the received multiplexed image data to said transmission line;

a separator for separating said frame signal received from said transmission line into image data for each of said logical channels;

an A/D converter for converting analog image data to be transmitted to digital image data;

a memory for storing said digital image data converted by said A/D converter;

an image encoder for encoding said digital image data;

a multiplexer for being input the coded image data and the separated image data which is separated by said separator, multiplexing these image data by inserting said coded image data into a designated one of said logical channels, and outputting the multiplexed image data to said line interface portion; and a control unit for controlling said multiplexer so as to insert said coded image data into said designated logical channel in accordance with the instruction for image transmission.

6. An image transmitting apparatus according to claim 5, wherein said control unit controls said multiplexer so as to multiplex said coded image data with the received multiplexed image data on a plurality of said logical channels in accordance with the instruction for image transmission.

7. An image transmitting apparatus according to claim 5, further comprising:

a means for extracting a network clock; and a phase lock loop (PLL) circuit for generating a clock which is synchronous with said network clock;

wherein a clock for operating said encoder and said memory is synchronized with said network clock.

8. An image transmitting apparatus according to claim 5, wherein said transmission line includes a first annular transmission line for transmitting the frame signal counterclockwise, and a second annular transmission line for transmitting said frame signal clockwise;

all of said line interface portion, said multiplexer and said separator are provided in pairs; and each of said line interface portions transmits said frame signal to the corresponding one of said annular transmission lines.

9. An image transmitting apparatus according to claim 5, wherein said encoder includes an intra-frame coding system and an inter-frame coding system as a coding system; and said digital image data are encoded and output by said intra-frame coding system for a predetermined period of time at the start of image transmission in accordance with an instruction from said control unit, and after said predetermined period of time, said image data are encoded and output by a mixture of said intra-frame coding system and said inter-frame coding system.

10. An image receiving apparatus for receiving an image transmitted from an image transmitting apparatus through a transmission line, comprising:

a line interface portion for receiving a frame signal composed of multiplexed image data of a plurality of logical channels from said transmission line, separating and outputting the image data of one of said logical channels which is allotted to said image receiving apparatus, and extracting a network clock;

a phase lock loop (PLL) portion for generating an internal clock which is synchronous with said network clock;

a synchronization detector for detecting synchronization and abnormal synchronization on the basis of synchronizing data which is added to said image data;

a decoder for decoding coded image data;

a memory for storing the image data for at least one picture which is output from said decoder;

a control unit for freezing an image or releasing freeze depending upon whether the signal output from said synchronization detector is an abnormal synchronization signal or a normal synchronization signal;

a selector for selecting the image data output from said decoder when synchronization is detected, while selecting the image data read from said memory when synchronization is abnormal; and a D/A converter for converting the digital image data output from said selector to analog image data.

* * * * *